United States Patent
Tanizawa et al.

(10) Patent No.: US 9,306,734 B2
(45) Date of Patent: Apr. 5, 2016

(54) COMMUNICATION DEVICE, KEY GENERATING DEVICE, AND COMPUTER READABLE MEDIUM

(71) Applicant: Kabushiki Kaisha Toshiba, Tokyo (JP)

(72) Inventors: Yoshimichi Tanizawa, Kanagawa (JP); Shinichi Baba, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 343 days.

(21) Appl. No.: 13/795,588

(22) Filed: Mar. 12, 2013

(65) Prior Publication Data

US 2014/0013101 A1   Jan. 9, 2014

(30) Foreign Application Priority Data

Jul. 6, 2012   (JP) .................................. 2012-152426

(51) Int. Cl.
*H04L 9/08*   (2006.01)
*H04L 9/16*   (2006.01)

(52) U.S. Cl.
CPC ............... *H04L 9/08* (2013.01); *H04L 9/0838* (2013.01); *H04L 9/0861* (2013.01); *H04L 9/16* (2013.01)

(58) Field of Classification Search
USPC .......... 713/150, 189, 171, 190, 191; 380/223, 380/226, 228, 259, 260, 264, 43, 277–286
See application file for complete search history.

(56) References Cited

U.S. PATENT DOCUMENTS

| 7,313,234 B2 | 12/2007 | Takagaki et al. |
| 2006/0204003 A1* | 9/2006 | Takata et al. .................... 380/30 |
| 2007/0192598 A1 | 8/2007 | Troxel et al. |
| 2013/0170645 A1* | 7/2013 | Chang ......................... 380/278 |

FOREIGN PATENT DOCUMENTS

| JP | 2004-254286 | 9/2004 |
| JP | 2004-254286 A | 9/2004 |
| JP | 2007-258850 | 10/2007 |
| JP | 2008-154019 | 7/2008 |
| JP | 2010-220038 | 9/2010 |
| JP | 2011-044768 A | 3/2011 |

OTHER PUBLICATIONS

Office Action issued Oct. 28, 2014 in Japanese Patent Application No. 2012-152426 (with English language translation).

(Continued)

*Primary Examiner* — Brandon Hoffman
*Assistant Examiner* — Samuel Ambaye
(74) *Attorney, Agent, or Firm* — Oblon, McClelland, Maier & Neustadt, L.L.P.

(57) ABSTRACT

According to an embodiment, a communication device is connected to a key generating device which generates an encryption key. The communication device includes a querying unit, an encryption processor, and a selecting unit. The querying unit is configured to send a query to the key generating device about capability information which indicates capability of the key generating device to generate the encryption key. The encryption processor is configured to implement a plurality of encryption functions. The selecting unit is configured to select, from among the plurality of encryption functions, an encryption function according to the capability information. The encryption processor implements the encryption function thus selected.

10 Claims, 4 Drawing Sheets

(56) References Cited

OTHER PUBLICATIONS

Office Action issued Jun. 10, 2014 in Japanese Patent Application No. 2012-152426 (with English language translation).

Toshio Hasegawa, et al., "Experimental realization of long-distance quantum cryptosystem", Symposium on Cryptography and Information Security (SCIS2003), 2003, pp. 1-6.

U.S. Appl. No. 13/714,809, filed Dec. 14, 2012, Yoshimichi Tanizawa, et al.

O. Maurhart, "QKD Networks Based on Q3P", Applied Quantum Cryptography, Lect. Notes Phys., vol. 797, Chapter 8, 2010, pp. 151-171.

Mehrdad Dianati, et al., "Architecture and protocols of the future European quantum key distribution network", Security and Communication Networks, vol. 1, 2008, pp. 57-74.

Office Action mailed Oct. 27, 2015 in Japanese Patent Application No. 2015-009801 (with English Translation).

* cited by examiner

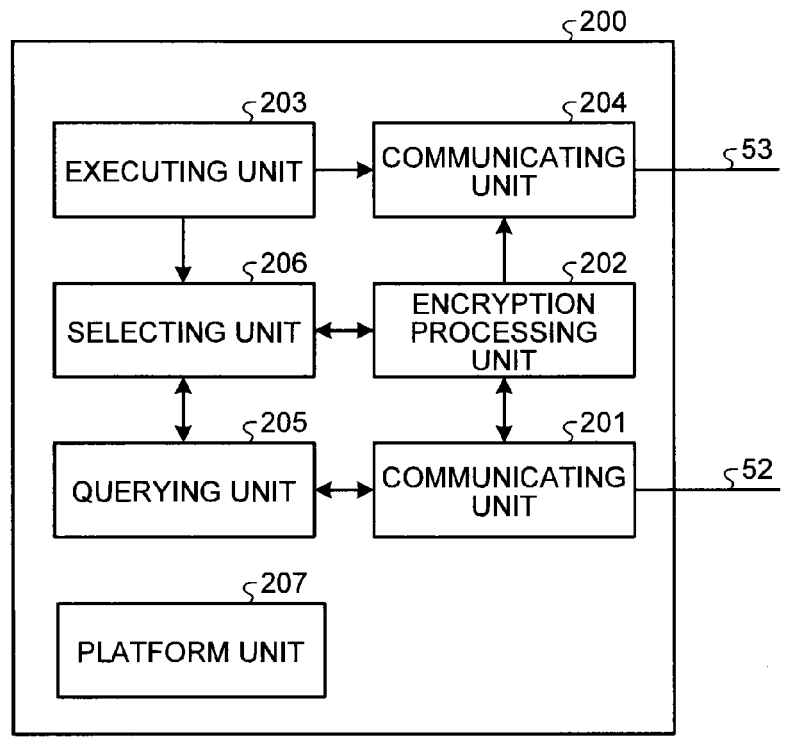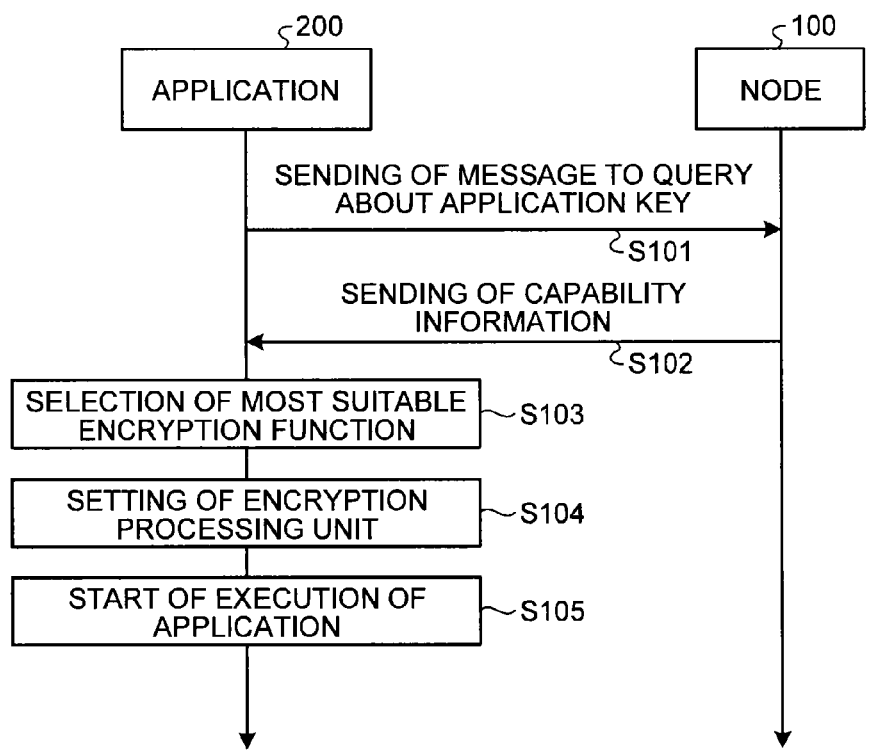

COMMUNICATION DEVICE, KEY GENERATING DEVICE, AND COMPUTER READABLE MEDIUM

CROSS-REFERENCE TO RELATED APPLICATIONS

This application is based upon and claims the benefit of priority from Japanese Patent Application No. 2012-152426, filed on Jul. 6, 2012; the entire contents of which are incorporated herein by reference.

FIELD

Embodiments described herein relate generally to a communication device, a key generating device, a communication method, a computer readable medium, and a communication system.

BACKGROUND

A cryptographic communication network is known that is configured with a plurality of networked nodes which is mutually connected by a plurality of links. Each node has the function of generating and sharing a random number with opposite nodes that are connected by links (hereinafter, also referred to as "a generating-sharing function"), as well as has the function of performing cryptographic communication over a link by using the random number as a cryptographic key (hereinafter, referred to as "a link key"). Moreover, some of the nodes also have the function of generating a random number independent of the links, as well as have the function of sending the generated random number to a different node. In a cryptographic communication network, an application has the function of obtaining a random number from a node, using the random number as a cryptographic key (hereinafter, referred to as "an application key"), and performing cryptographic communication with another application. Herein, an application can be configured in an integrated manner with the nodes, or can be configured as a terminal independent of the nodes.

In a node, the generating-sharing function, by which a random number (a link key) is generated and shared with opposite nodes connected by links, can be implemented using a technology that is commonly called quantum cryptographic communication, for example. In this case, the technology by which, in a node, a random number (an application key) is generated independent of the links and sent to a different node via a link may be called quantum key distribution (QKD).

In a node in a cryptographic communication network, a random number (i.e., an application key) generated independent of the links is only a finite resource in the cryptographic communication network. Moreover, even regarding the speed of generating an application key, there is an upper limit from the technical perspective. Hence, as far as an application is concerned, although the method of obtaining an application key from a node and performing cryptographic communication is the most secure way of communication; it may not necessarily be the most suitable cryptographic communication if the cost is also taken into account. For example, in the light of the limitations in communication throughput and the cost incurred due to the use of finite resources, there are times when some other cryptographic communication method (i.e., a communication method other than the method of obtaining an application key from a node in a cryptographic communication network and performing cryptographic communication) fulfills the demands of an application even if there is a decline in the level of security. In this way, the method of obtaining an application key from a node and performing cryptographic communication is not always necessarily the most suitable method. Thus, in the conventional method, after taking into account the throughput and the cost, it is not possible to select the most suitable cryptographic communication method in the context of the demands of an application.

BRIEF DESCRIPTION OF THE DRAWINGS

FIG. 3 is a block diagram of a configuration example of an application according to the first embodiment;

FIG. 4 is a sequence diagram illustrating an exemplary sequence of operations performed during a communication operation in the communication system according to the first embodiment;

DETAILED DESCRIPTION

According to an embodiment, a communication device is connected to a key generating device which generates an encryption key. The communication device includes a querying unit, an encryption processor, and a selecting unit. The querying unit is configured to send a query to the key generating device about capability information which indicates capability of the key generating device to generate the encryption key. The encryption processor is configured to implement a plurality of encryption functions. The selecting unit is configured to select, from among the plurality of encryption functions, an encryption function according to the capability information. The encryption processor implements the encryption function thus selected.

Various embodiments will be described below in detail with reference to the accompanying drawings.

First Embodiment

In a communication system according to a first embodiment, an application sends a query to a node about capability information which indicates the capability of the node to generate an application key (hereinafter, capability information is referred to as "application key information"). Then, the application compares the implementable encryption function and the achievable encryption performance in the case when an application key is obtained with the implementable encryption function and the achievable encryption performance in the case when an application key is not obtained, and selects the most suitable cryptographic communication method in the context of application demands.

Figure 1:
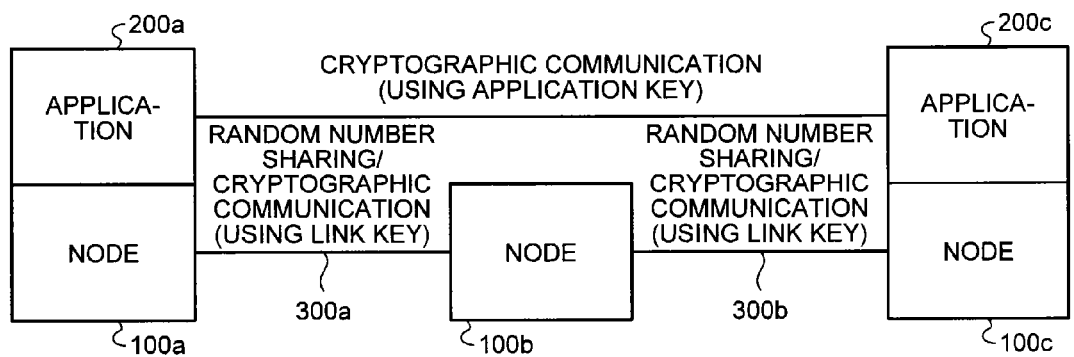
FIG. 1 is a diagram illustrating an example of a network configuration of a communication system according to embodiments.

The application key information contains, for example, the following information:

(A) the volume of application keys that the node can currently provide to the application (B) from among the throughput of application keys that are generated and shared, information related to the throughput of application keys that the node can currently allot to the application (C) information related to the necessary cost in the case when the volume or the throughput of application keys is allotted to the application FIG. 1 is a diagram illustrating an example of a network configuration of the communication system according to the embodiments. The communication system includes nodes 100a to 100c, which function as key generating devices, and applications 200a and 200c.

When there is no need to distinguish between the nodes 100a to 100c, they are simply referred to as nodes 100. Similarly, when there is no need to distinguish between the applications 200a and 200c, they are simply referred to as applications 200. Meanwhile, the number of nodes 100 is not limited to three, and the number of applications 200 is not limited to two.

Each of the nodes 100a to 100c has the function of generating and sharing a random number with opposite nodes and has the function of performing cryptographic communication over links (links 300a and 300b) by using a random number as a cryptographic key. Moreover, each node 100 can also have the function of generating a random number independent of the links, and the function of sending the generated random number to a different node.

Figure 2:
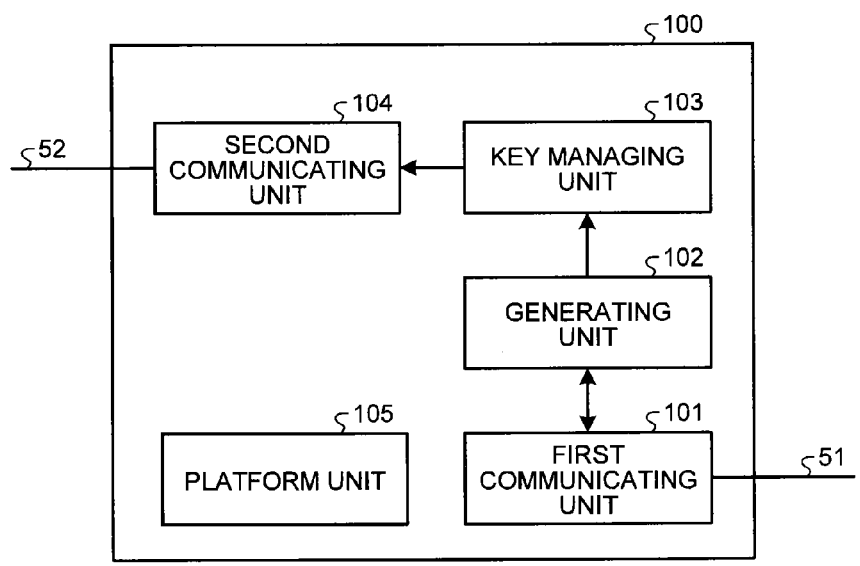
FIG. 2 is a block diagram illustrating a configuration example of a node according to a first embodiment.

FIG. 2 is a block diagram illustrating a configuration example of the node 100. As illustrated in FIG. 2, the node 100 includes a first communicating unit 101, a generating unit 102, a key managing unit 103, a second communicating unit 104, and a platform unit 105.

The first communicating unit 101 implements the quantum cryptographic communication technology to generate and share a random number with a different node (external device) (hereinafter, also referred to as "an opposite node") that is connected by a link 51 that is the communication link (an internode communication link); and manages the generated random number as a link key. Meanwhile, the generation and sharing of a link key can be performed by implementing a method other than the quantum cryptographic communication technology. The first communicating unit 101 is used in performing communication of data with a different node that is connected by the link 51 (i.e., used in performing internode data communication). Herein, the different node with which data is to be communicated either can be the opposite node connected directly by the link 51 or can be a still different node connected via a different link of the opposite node. In the latter case, the first communicating unit 101 can be equipped with a routing function for performing communication via a plurality of nodes 100 in the cryptographic communication network. Moreover, the internode data communication can be performed in an encrypted form using the link key managed by the first communicating unit 101.

The generating unit 102 has, independent of the first communicating unit 101, the function of generating a random number and sharing that random number with another node 100. At the time of sharing the random number with another node 100, the generating unit 102 can make use of the functionality of the first communicating unit 101. A random number generated and shared by the generating unit 102 is called an application key.

Moreover, the generating unit 102 has the function of responding to a query that is received from the application 200 via the second communicating unit 104 and notifying the application 200 about the currently-providable volume of application keys; about the information related to the application keys throughput that can be currently allotted to the application 200 from among the application keys being currently generated and shared; and about the information related to the necessary cost for achieving the throughput or the volume of application keys. The node 100 can implement any arbitrary method to know about such information. That is, as long as the node 100 gets to know about such information, any method can be implemented.

The key managing unit 103 manages the application keys that are generated and shared by the generating unit 102. Moreover, in response to a request from the second communicating unit 104, the key managing unit 103 selectively sends an appropriate application key to the second communicating unit 104.

The second communicating unit 104 establishes a connection with the application 200 via a link 52 (an application communication link) that is the communication link for communicating with the application 200, and communicates with the application 200. The second communicating unit 104 receives a request from the application 200 and accordingly provides an application key to the application 200.

Herein, since the application communication link is not particularly defined, it is possible to have the application 200 installed in a different computer that is connected to the node 100 via some network. In this case, in the network through which the node 100 and the application 200 are connected, existing network security functionality such as a firewall, data encryption, and data authentication can be implemented. Alternatively, it is possible to have the application 200 installed in the node 100 and connected to the second communicating unit 104 via an application program interface (API) designed using software.

The platform unit 105 provides operating system functionality of a computer that is necessary for operations and management of the other constituent elements in the node 100.

Described above was the configuration of the node 100 according to the first embodiment. Given below is a configuration example of the application 200 according to the first embodiment. FIG. 3 is a block diagram of a configuration example of the application 200 according to the first embodiment. As illustrated in FIG. 3, the application 200 includes a communicating unit 201, an encryption processing unit 202, an executing unit 203, a communicating unit 204, a querying unit 205, a selecting unit 206, and a platform unit 207.

The communicating unit 201 establishes a connection with a node 100 (more particularly, with the second communicating unit 104 of a node 100) via the application communication link (via the link 52) and communicates a variety of data. For example, from the node 100, the communicating unit 201 obtains an application key that is necessary for performing cryptographic communication.

The encryption processing unit 202 provides the functionality for performing data encryption and data decryption. In the first embodiment, the encryption processing unit 202 implements an encryption function that is selected from a plurality of encryption functions. Herein, the providable encryption function or the performance thereof varies depending on the security chip disposed in the application 200 or depending on the hardware resources such as a central processing unit (CPU) and software resources such as an encryption library. As the providable encryption function; the application key obtained by the communicating unit 201 is held and used to perform encryption and decryption of data that is required in performing cryptographic communication.

Meanwhile, there is no particular restriction on the encryption algorithm (encryption method) to be used in an encryption function. Thus, the application key also may or may not be used. Moreover, for example, a block cipher such as the advanced encryption standard (AES) can be used, or a Vernam cipher such as the one-time pad (OTP) can be used.

Moreover, the encryption processing unit 202 can be configured to get to know about the information related to the providable encryption function and the information related to the performance thereof, and to notify the selecting unit 206 about such information. The information related to an encryption function generally points to the information about the supported encryption algorithm, the supported authentication algorithm, and the key length. For example, the information can be a character string such as "AES-128-CBC", "AES-256-CBC", or "DES-EDE3" that indicates the algorithm, the key length, and the mode. The information related to the performance points to the information related to the volume of data for every given length of time and the CPU load at the time of using the encryption function. For example, the information related to the performance contains the throughput format, such as 10 Gbps or 100 Mbps, and the CPU load (% display). Alternatively, the information related to the performance can be expressed in the form of the necessary number of CPU commands for processing data of a given size.

In the first embodiment, the encryption processing unit 202 can implement any arbitrary method to know about such information. That is, as long as the encryption processing unit 202 gets to know about such information, any method can be implemented.

As far as the encryption function to be implemented by the encryption processing unit 202 is concerned, the selecting unit 206 (described later) makes the determination and selection. Moreover, the encryption function that is used by the encryption processing unit 202 can be concealed from the executing unit 203 and the communicating unit 204.

The executing unit 203 implements an application function for performing cryptographic communication. As long as communication is possible, there is no particular restriction on the type of the application function. For example, the executing unit 203 implements a video transmission function. With that, the executing unit 203 sends transmit data to the communicating unit 204 and receives incoming data from the communicating unit 204.

It is assumed that the executing unit 203 holds information related to application requests (request information) in some way (such as by means of the settings performed by the user, the administrator, and the application developer; by means of statistical information processing; or by means of automated control). The request information points to values obtained by quantifying, for example, the security (a request for the security of encryption and decryption); the throughput (a request for communication speed); the cost (a request for the cost (such as the monetary cost) that is incurred by consuming the finite resources of application keys); and the priority among the security, the throughput, and the cost.

The communicating unit 204 provides the communication function that is required for the operations of the executing unit 203. Moreover, while performing data communication, the communicating unit 204 can perform data encryption and data decryption using the encryption processing unit 202. The communicating unit 204 receives data transmitted from the application 200, encrypts that data using the encryption processing unit 202, and sends the encrypted data via a data communication link (a link 53). Herein, the data communication link enables communication of data with the application 200 present on the other side of communication. Once data is received from the data communication link, the communicating unit 204 decrypts the received data using the encryption processing unit 202 and sends the decrypted data to the application 200.

The querying unit 205 sends a query to the node 100 about the application key information, such as the information (A) to the information (C) mentioned above, via the communicating unit 201. The information obtained in response to the query is sent to the selecting unit 206.

The selecting unit 206 refers to the application key information and selects the most suitable encryption function at the time of executing the application 200. Apart from referring to the application key information obtained by querying the node 100, the selecting unit 206 can also refer to the following information related to the application 200 (hereinafter, referred to as "application information") and select the encryption function.

(1) request information obtained from the executing unit 203
(2) information (hereinafter, referred to as "encryption function information") that is obtained from the encryption processing unit 202 and that is related to the encryption functions implementable in the application 200 and the performance of those encryption functions
(3) information (hereinafter, referred to as "resource information") that is obtained from the platform unit 207 and that is related to the current resource usage status in the application 200

However, there is no restriction on the information referred to by the selecting unit 206 at the time of selecting an encryption function. That is, the selecting unit 206 can refer to only some of the information mentioned above.

The platform unit 207 provides operating system functionality of a computer that is necessary for operations and management of the other constituent elements in the application 200.

Described above was the configuration of the application 200 according to the first embodiment. However, that explanation is only exemplary.

Meanwhile, the constituent elements of the node 100 as well as the application 200 can be implemented by running computer programs in a processing unit such as a CPU, that is, can be implemented using software; or can be implemented using hardware such as an integrated circuit (IC); or can be implemented using a combination of software and hardware.

Given below is the explanation regarding a sequence of operations performed in the first embodiment. FIG. 4 is a sequence diagram illustrating an exemplary sequence of operations performed during the communication operation in the communication system according to the first embodiment. Herein, FIG. 4 illustrates a sequence of operations in the case in which, at the time of starting cryptographic communication, the application 200 sends a query to the node 100 about the application key generation status and selects the most suitable encryption function.

Prior to starting the execution of an application, the executing unit 203 of the application 200 notifies the selecting unit 206 about request information held in the executing unit 203, and sends a query about the most suitable encryption function associated with the execution of the application. In response to the query, the selecting unit 206 instructs the querying unit 205 to query about application keys (i.e., instructs the querying unit 205 to perform a key query). Then, in response to the instruction, the querying unit 205 sends a message regarding key query to the node 100 via the communicating unit 201 (Step S101).

In the node 100, the second communicating unit 104 receives the message regarding key query and notifies the key managing unit 103 about the key query. In response to the key query, the key managing unit 103 sends back at least one piece of application key information from among the information (A) to the information (C) to the application 200 via the second communicating unit 104 (Step S102). Then, in the application 200, the communicating unit 201 notifies the querying unit 205 about the application key information that has been received. Then, the querying unit 205 notifies the selecting unit 206 about the application key information.

The selecting unit 206 obtains the application key information from the querying unit 205. Moreover, the selecting unit 206 can also send a query regarding the providable encryption functions to the encryption processing unit 202. In response to such a query, the encryption processing unit 202 provides the encryption function information to the selecting unit 206. Herein, more particularly, the encryption function information contains information related to the functionality and the performance of the usable security chip (hardware) resources as well as information related to the functionality and the performance of the usable encryption library (software).

Furthermore, the selecting unit 206 can also send a query to the platform unit 207 regarding the resource usage status in the application. In response to that query, the platform unit 207 provides the resource information to the selecting unit 206. Herein, more particularly, the resource information contains the CPU load, the memory usage, the progress status of other jobs, and the usage status of the security chip.

Meanwhile, there is no particular restriction on the timing at which the selecting unit 206 obtains the application key information from the querying unit 205 or on the timing at which the encryption processing unit 202 sends a query to the platform unit 207 and obtains information. Thus, either one of the two operations can be performed first. Alternatively, either one or both of the operations can be performed in advance before the execution of the sequence.

In this way, the selecting unit 206 can receive the request information from the executing unit 203, can receive the application key information from the querying unit 205, can receive the encryption function information from the encryption processing unit 202, and can receive the resource information from the platform unit 207. However, that is not the only possible case. Alternatively, it is also possible if only some of that information is used, or some information other than the abovementioned information is obtained.

Then, based on the information mentioned above, the selecting unit 206 selects the most suitable encryption function in the context of the application request (request information) (Step S103). There is no particular restriction on the method selecting the most suitable encryption function. That is, various methods can be implemented to select the most suitable encryption function. For example, if an application request reads "communication of the highest level of security is to be performed while ensuring a throughput X"; it is possible to implement the selection method as described below. Meanwhile, in this example, for the sake of simplification, it is assumed that the application 200 supports only AES using a security chip. Moreover, it is assumed that the following types of encryption function can be implemented.
(C1) OTP encryption using application key (hereinafter, referred to as "QKD OTP")
(C2) AES block encryption using application key (hereinafter, referred to as "QKD AES")
(C3) normal AES encryption Moreover, it is assumed that there is no cost difference among these three types of encryption function, and that (C1), (C2), and (C3) are listed in order of high level of security.

Firstly, the selecting unit 206 determines whether or not a throughput A that is obtained in the case of implementing the encryption function (C1) having the highest level of security is equal to or greater than the throughput X. From among the application key information, the throughput A can be calculated using the information related to the application key throughput that can be allotted to the application. If the throughput X is smaller than the throughput A, then the selecting unit 206 determines that the encryption function (C1) is the most suitable encryption function to use. Otherwise, the selecting unit 206 determines that the encryption function (C1) is not the most suitable encryption function.

Then, the selecting unit 206 determines whether or not a throughput B of the encryption function (C2) having the second-highest level of security is equal to or greater than the throughput X. From among the application key information, the throughput B can be calculated using the information related to the application key throughput that can be allotted to the application 200 and using the AES key length used in the encryption function (C2) and the performance of the usable security chip or the performance of the usable encryption library. If the throughput X is smaller than the throughput B, then the selecting unit 206 determines that the encryption function (C2) is the most suitable encryption function to use. Otherwise, the selecting unit 206 determines that the encryption function (C2) is not the most suitable encryption function.

Lastly, the selecting unit 206 determines whether or not a throughput C of the encryption function (C3) having the third-highest level of security is equal to or greater than the throughput X. From among the application key information, the throughput C can be calculated using the AES key length used in the encryption function (C3) and the performance of the usable security chip or the performance of the usable encryption library. If the throughput X is smaller than the throughput C, then the selecting unit 206 determines that the encryption function (C3) is the most suitable encryption function to use.

In the example explained above, as an application request, only a throughput request is taken into account. However, for example, the comparison and determination identical to the explanation given above can be performed even when an application request (a cost request) related to cost reads "communication of the highest level of security is to be performed while cutting down the cost to or below a cost Y". Moreover, although not used in the example explained above, in the case when, for example, it is stated with respect to the application 200 that "communication data volume is Z"; the comparison can be performed also regarding the volume of application keys that can be provided to the application 200.

Meanwhile, when not a single encryption function is found that satisfies the application request, there are some methods which can be implemented. For example, there is a method in which an encryption function that is closest to the application request is selected and considered as the most suitable encryption function. Alternatively, there is a method in which an error indicating that no suitable encryption function is found is sent to the application 200 or to the user.

The selecting unit 206 sets the encryption processing unit 202 in such a way that the encryption function determined (selected) to be the most suitable encryption function is implemented (Step S104). Moreover, the selecting unit 206 can notify the executing unit 203 about the completion in the selection of the encryption function or about the selected encryption function.

Then, the executing unit 203 starts executing the application 200 (Step S105). While performing data communication, the application 200 makes use of the communicating unit 204. At that time, encryption and decryption of the communication data is performed by the encryption processing unit 202 that is set to be the most suitable by the selecting unit 206. Meanwhile, if the application key provided from the node 100 is not required, then the application 200 may not use the application key and can perform cryptographic communication using an encryption function obtained by implementing a different encryption method and using a different encryption key.

In this way, in the communication system according to the first embodiment, an application can select the most suitable encryption function using application key information that is obtained by querying a node and using an application request.

Modification Example

In the first embodiment, an encryption function is selected before starting the execution of the application function (cryptographic communication). In contrast, in a modification example, the encryption function to be implemented can be dynamically changed in the course of cryptographic communication (first modification function). Moreover, in the first embodiment, the single most suitable cryptographic communication method (encryption function) is selected. However, the number of selectable encryption functions is not limited to one. In the communication system according to the modification example, a combination of most suitable cryptographic communication methods is selected (i.e., a plurality of encryption functions is selected) (second modification function). Meanwhile, it is also possible to implement only one of the first modification function and the second modification function.

In the modification example, the constituent elements of the application 200 differ from the first embodiment in the following points.

In the course of cryptographic communication, the encryption processing unit 202 can dynamically change the encryption function to be implemented. Moreover, the encryption processing unit 202 can concurrently set a plurality of encryption functions (encryption algorithms), and cryptographic communication can be performed thereafter. Furthermore, the encryption processing unit 202 can receive, from the communicating unit 204, data to be transmitted (transmitted data) as well as metadata such as the degree of importance of the transmitted data and the secret level of the transmitted data; and accordingly select the encryption functions (encryption algorithms) that are to be used in encrypting the transmit data. Alternatively, without receiving metadata from the communicating unit 204, the encryption processing unit 202 can select the encryption algorithms on the basis of the received data.

Moreover, the communicating unit 204 can send metadata such as the degree of importance of data to the encryption processing unit 202.

Furthermore, the querying unit 205 can send queries and results to the encryption processing unit 202 even in the course of cryptographic communication.

Moreover, the selecting unit 206 can perform determination even in the course of cryptographic communication. Furthermore, the selecting unit 206 can select a combination of most suitable encryption functions in the context of an application request.

Described above was the configuration of nodes and applications according to the modification example. However, that explanation is only exemplary.

Given below is the explanation regarding a sequence of operations performed in the modification example. Herein, the sequence of operations is identical to the sequence of operations illustrated in FIG. 4 according to the first embodiment. In the sequence of operations according to the modification example; for example, while cryptographic communication is being carried out, the application 200 sends a query to the node 100 about the application key generation status and selects the most suitable encryption functions. The following explanation is given with the focus on the differences with the first embodiment.

Even while an application is being executed, the selecting unit 206 periodically instructs the querying unit 205 to query about application keys. Then, in response to each instruction, the querying unit 205 sends a message regarding key query to the node 100 via the communicating unit 201 (Step S101).

The node 100 responds to each query (Step S102). At that time, the response from the node 100 includes the current application key information that is being cryptographically communicated. Meanwhile, alternatively, the configuration can be such that key queries (Step S101) are not sent, and the node 100 directly notifies the application 200 about the application key information (Step S102).

In the application 200, the communicating unit 201 notifies the querying unit 205 about the application key information. Then, the querying unit 205 notifies the selecting unit 206 about the application key information.

The selecting unit 206 obtains the application key information from the querying unit 205. The selecting unit 206 can receive dynamic information during communication. More particularly, the selecting unit 206 obtains the request information from the executing unit 203, receives the application key information from the querying unit 205, receives the encryption function information from the encryption processing unit 202, and receives the resource information from the platform unit 207. However, that explanation is only exemplary. That is, the selecting unit 206 can refer to only some of the information mentioned above or can obtain some other information different than the abovementioned information.

Then, based on the information mentioned above, the selecting unit 206 selects most suitable encryption functions in the context of the application request (Step S103).

As a selection result at that time, the selecting unit 206 can determine that, for example, "a combination of an encryption function A and an encryption function B" represents the most suitable combination. Meanwhile, as the determination criterion, for example, a logic can be used that indicates the encryption functions to be implemented so as to maintain the request throughput.

The selecting unit 206 sets the encryption processing unit 202 in such a way that the encryption functions determined (selected) to be most suitable are used (Step S104). Such setting gets reflected even during cryptographic communication. Thus, such setting can be performed when it is necessary to negotiate with the application on the other side of communication about the encryption method.

When a plurality of encryption functions is selected, the criterion for using each encryption function (i.e., encryption function selection criterion) is determined. A selection criterion is used in determining an encryption function by referring to, for example, the type of transmit data and the additionally-sent metadata of transmit data.

The executing unit 203 continues with the execution of the application 200. Although the application 200 is transparent in nature; during data communication, the encryption function used by the encryption processing unit 202 may undergo changes as compared to the time of starting the application. Due to such changes, even in the case when the usable application key throughput actually changes because of the functions of the node 100, it becomes possible to maintain the communication throughput that is usable by the application 200.

In the case of using a combination of a plurality of encryption functions (for example, the encryption function A and the encryption function B), various methods can be thought of.

For example, the combination of the encryption function A and the encryption function B can be put to use by defining a new encryption function in such a way that a single data packet contains, in the first half, encrypted data that is encrypted by the encryption function A and contains, in the latter half, encrypted data encrypted by the encryption function B. This method is not limited to data packets. For example, even during communication using data streams, it is possible to use a data stream that alternately contains encrypted data of a predetermined data size that is encrypted by the encryption function A and encrypted data of a predetermined data size that is encrypted by the encryption function B.

Moreover, alternatively, for each encryption function, it is also possible to perform a different type of data communication. That is, in the communicating unit 204, for example, a TCP connection (TCP stands for transmission control protocol) used by the encryption function A to perform communication can be established, a TCP connection used by the encryption function B to perform communication can be established, and data communication can be performed using the two TCP connections in parallel. However, in this case, in the application 200 that is the data receiving side, the communicating unit 204 needs to perform sequencing control with respect to the data, which is received via a plurality of TCP connections, by referring to the information such as sequence numbers specified in the received data or the headers; before sending the received data to the executing unit 203.

Moreover, in the case of using the two TCP connections in parallel (of course, also in the case of not using the two TCP connections in parallel), it is necessary to negotiate and come to an agreement with the application 200, which is the other side of communication, about the encryption function to be implemented or the combination of encryption functions to be implemented as well as about the method of combining the encryption functions. As the methods of negotiation for achieving that purpose, it is possible to make use of the encryption algorithm negotiation provided in the handshake functionality of the communicating unit 204. Such methods of encryption algorithm negotiation are known methods that are commonly known in TLS/SSL (TLS stands for transport layer security, SSL stands for secure socket layer). In the case of negotiating about the combination of encryption functions to be implemented or negotiating about the method of combining the encryption functions along with using encryption algorithm negotiation, it is necessary that a method of expressing the combination of encryption functions to be implemented or expressing the method of combining the encryption functions is defined and agreed upon in advance by the application.

Second Embodiment

In a communication system according to a second embodiment, instead of an application selecting the most suitable encryption function, a node selects the most suitable encryption function. In that regard, a node receives request information, encryption function information, and resource information from an application; refers to the received information and to application key information that can be obtained from within the node; accordingly selects the most suitable encryption function; and notifies the application about the selected encryption function.

Figure 5:
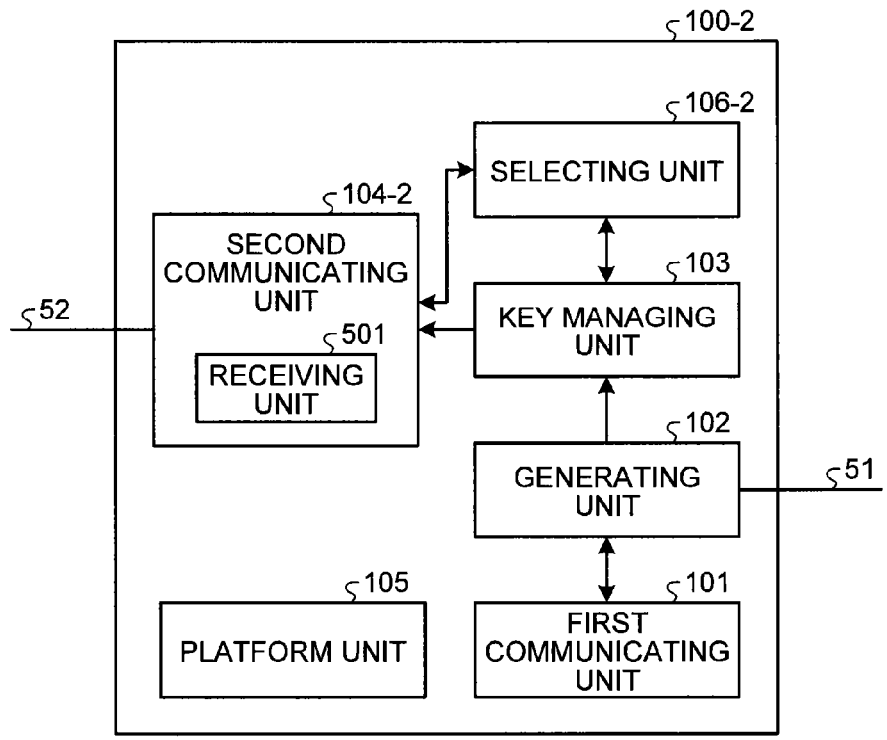
FIG. 5 is a block diagram illustrating a configuration example of a node according to a second embodiment.

FIG. 5 is a block diagram illustrating a configuration example of a node 100-2 according to the second embodiment. As illustrated in FIG. 5, the node 100-2 includes the first communicating unit 101, the generating unit 102, the key managing unit 103, a second communicating unit 104-2, the platform unit 105, and a selecting unit 106-2.

As compared to the first embodiment, the second embodiment differs in the way that the selecting unit 106-2 is additionally disposed and the second communicating unit 104-2 has different functions than the second communicating unit 104. The rest of the constituent elements have identical configurations and functions as those illustrated in FIG. 2, which is the block diagram of the node 100 according to the first embodiment. Hence, those constituent elements are referred to by the same reference numerals and the explanation thereof is not repeated.

The second communicating unit 104-2 not only is equipped with the functions of the second communicating unit 104 according to the first embodiment but also has a function of receiving request information from an application 200-2 (described later) according to the second embodiment. For that, the second communicating unit 104-2 includes a receiving unit 501 that receives encryption function information, which indicates a plurality of encryption functions that the application 200-2 can implement, from the application 200-2.

The selecting unit 106-2 has, in an identical manner to the selecting unit 206 according to the first embodiment, the function of selecting the most suitable encryption function by referring to the encryption function information received from the application 200-2 and to application key information obtained from the key managing unit 103. Moreover, via the second communicating unit 104-2, the selecting unit 106-2 sets the encryption processing unit 202 of the application 200-2 in such a way that the selected encryption function is implemented.

Figure 6:
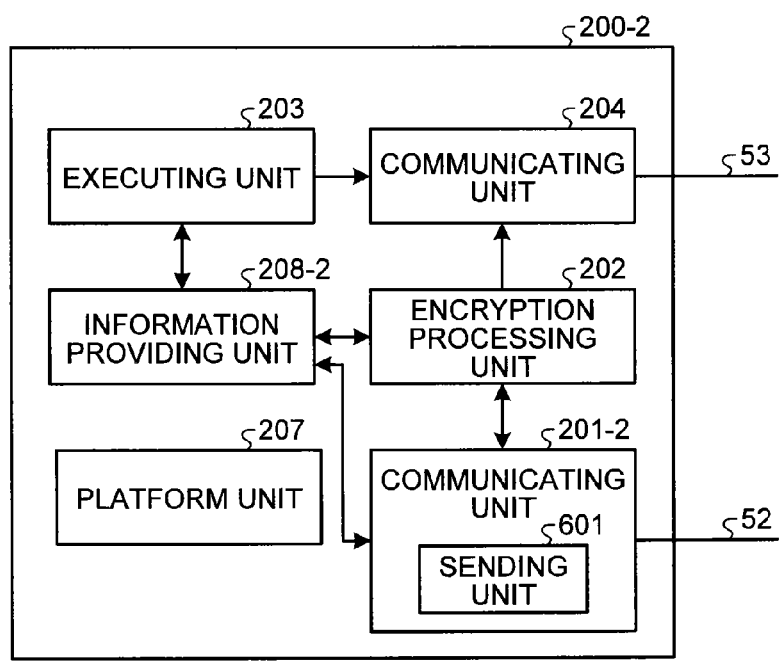
FIG. 6 is a block diagram of a configuration example of an application according to the second embodiment.

FIG. 6 is a block diagram of a configuration example of the application 200-2 according to the second embodiment. As illustrated in FIG. 6, the application 200-2 includes a communicating unit 201-2, the encryption processing unit 202, the executing unit 203, the communicating unit 204, the platform unit 207, and an information providing unit 208-2.

Herein, as compared to the first embodiment, the second embodiment differs in the way that the information providing unit 208-2 is additionally disposed, that the communicating unit 201-2 has different functions than the communicating unit 201, and that the querying unit 205 and the selecting unit 206 are deleted. The rest of the constituent elements have identical configurations and functions as those illustrated in FIG. 3, which is the block diagram of the application 200 according to the first embodiment. Hence, those constituent elements are referred to by the same reference numerals and the explanation thereof is not repeated.

The information providing unit 208-2 provides application information, which is obtained from the encryption processing unit 202, to the node 100-2 via a sending unit 601. For example, the information providing unit 208-2 obtains request information from the executing unit 203, obtains encryption function information from the encryption processing unit 202, and obtains resource information from the platform unit 207. Then, via the sending unit 601, the information providing unit 208-2 notifies the node 100-2 about the application information that has been obtained.

The communicating unit 201-2 not only is equipped with the functions of the communicating unit 201 according to the first embodiment but also includes the sending unit 601 that sends the encryption function information and the like, which is provided by the information providing unit 208-2, to the node 100-2.

The encryption processing unit 202 is identical to that explained in the first embodiment. However, the settings regarding the encryption function to be implemented is performed by, for example, the communicating unit 201-2 upon receiving the selection result. Thus, for example, encryption setting information indicating the encryption function selected by the node 100-2 is sent to the application 200-2. Then, a constituent element (such as the communicating unit 201-2) of the application 200-2 sets the encryption processing unit 202 in such a way that the encryption function corresponding to the encryption setting information is implemented. Meanwhile, alternatively, via the communicating unit 201-2, the selecting unit 106-2 of the node 100-2 can set the encryption processing unit 202 in such a way that the selected encryption function is implemented.

Figure 7:
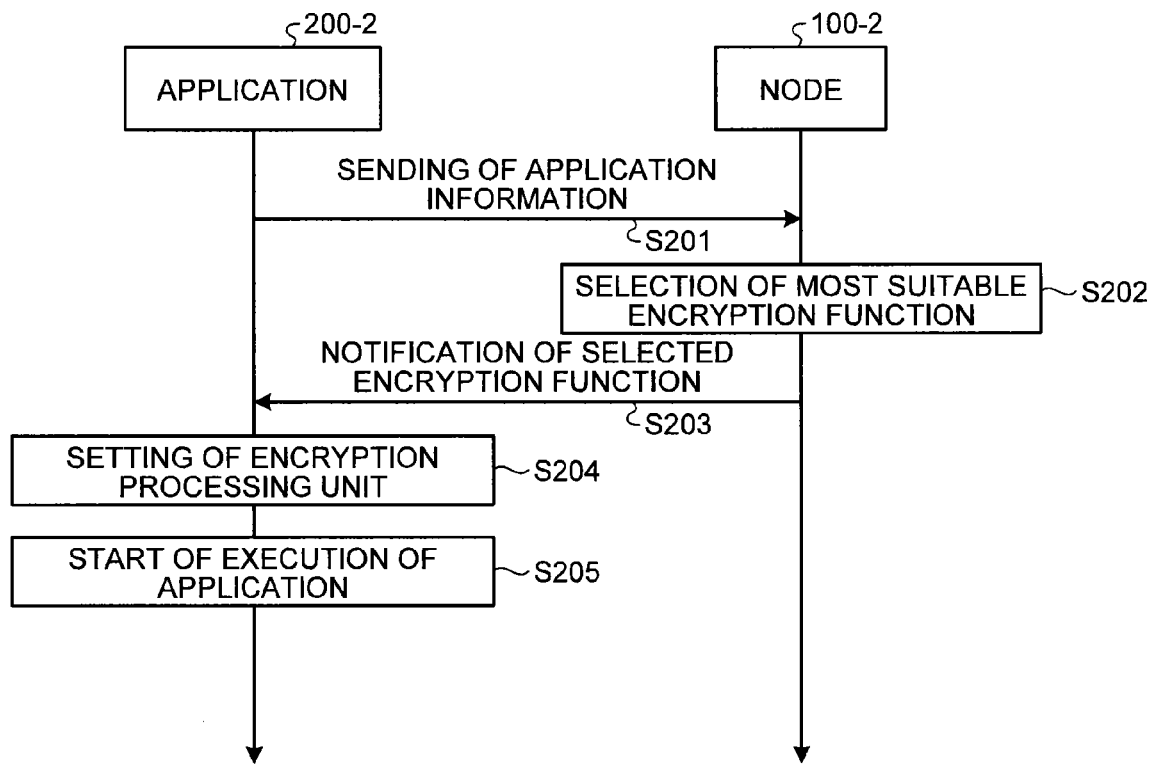
FIG. 7 is a sequence diagram illustrating an exemplary sequence of operations performed during a communication operation in the communication system according to the second embodiment.

Given below is the explanation regarding a sequence of operations performed in the second embodiment. FIG. 7 is a sequence diagram illustrating an exemplary sequence of operations performed during the communication operation in the communication system according to the second embodiment. Herein, FIG. 7 illustrates a sequence of operations in the case in which, at the time of starting cryptographic communication, the application 200-2 provides the node 100-2 with application information; and the node 100-2 takes into account the application key generation status while selecting an encryption function that is most suitable to the application 200-2 and notifies the application 200-2 about the selected encryption function.

Prior to starting the execution of an application, the executing unit 203 of the application 200-2 notifies the information providing unit 208-2 about request information held in the executing unit 203. Moreover, the information providing unit 208-2 can send a query to the encryption processing unit 202 about the providable encryption function. In response to the query, the encryption processing unit 202 provides encryption function information to the information providing unit 208-2.

Furthermore, the information providing unit 208-2 can send a query to the platform unit 207 about the resource usage status in the application. In response to that query, the platform unit 207 provides resource information to the information providing unit 208-2.

In this way, the information providing unit 208-2 obtains the request information from the executing unit 203, obtains the encryption function information from the encryption processing unit 202, and obtains the resource information from the platform unit 207. However, that explanation is only exemplary. That is, the information providing unit 208-2 can refer to only some of the information mentioned above or can obtain some other information different than the abovementioned information.

The information providing unit 208-2 notifies the node 100-2 about the obtained application information (the request information, the encryption function information, and the resource information) via the communicating unit 201-2 (Step S201).

In the node 100-2, the second communicating unit 104-2 receives the application information and notifies it to the selecting unit 106-2.

Then, the selecting unit 106-2 sends a query to the key managing unit 103 about the application key information held in the key managing unit 103. Meanwhile, there is no particular restriction on the timing at which the selecting unit 106-2 sends a query to the key managing unit 103 or on the timing at which the second communicating unit 104-2 obtains the application information from the application 200-2. Thus, either one of the two operations can be performed first, or both operations can be performed in parallel.

In this way, the selecting unit 106-2 can obtain the request information, the encryption function information, and the resource information from the second communicating unit 104-2; and can obtain the application key information from the key managing unit 103. However, that explanation is only exemplary. That is, the selecting unit 106-2 can refer to only some of the information mentioned above or can obtain some other information different than the abovementioned information.

Then, based on the information mentioned above, the selecting unit 106-2 selects the most suitable encryption function in the context of the application request (Step S202). Herein, as far as the methods of selection are concerned, various methods can be implemented in an identical manner to the first embodiment. Moreover, when not a single encryption function is found that satisfies the application request, there are some methods which can be implemented in an identical manner to the first embodiment.

Then, via the second communicating unit 104-2, the selecting unit 106-2 notifies the application 200-2 about the encryption function that is determined (selected) to be most suitable (Step S203).

In the application 200-2, the communicating unit 201-2 obtains the selection result regarding the most suitable encryption function. Based on the selection result, the communicating unit 201-2 sets the encryption processing unit 202 in such a way that the most suitable encryption function is implemented (Step S204). Moreover, the communicating unit 201-2 can notify the information providing unit 208-2 or the executing unit 203 about the completion in the selection of the encryption function and about the selected encryption function.

Then, the executing unit 203 starts executing the application 200-2 (Step S205). While performing data communication, the application 200-2 makes use of the communicating unit 204. At that time, encryption and decryption of the communication data is performed by the encryption processing unit 202 that is set to be the most suitable by the selecting unit 106-2.

In this way, in the communication system according to the second embodiment, a node can select the most suitable encryption function by referring to application key information and to application information obtained from an application.

Meanwhile, in the second embodiment, in an identical manner to the modification example of the first embodiment, it is also possible to provide at least either the function of dynamically changing the encryption function in the course of cryptographic communication (first modification function) or the function of selecting a combination of most suitable cryptographic communication methods (selecting a plurality of encryption functions) (second modification function).

As described above, according to the first and second embodiments, the most suitable encryption communication method can be selected in the context of an application and also by taking into account the throughput and the cost.

Figure 8:
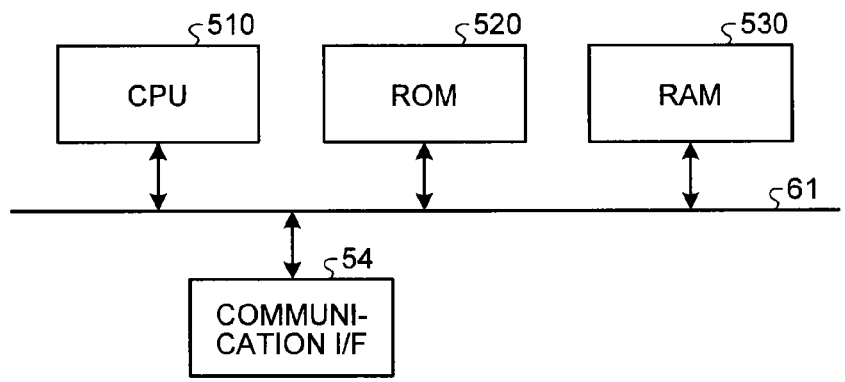
FIG. 8 is an explanatory diagram for explaining a hardware configuration of devices according to the first and second embodiments.

Explained below with reference to FIG. 3 is a hardware configuration of devices (a communication device and a key generating device) according to the first and second embodiments. FIG. 8 is an explanatory diagram for explaining a hardware configuration of devices according to the first and second embodiments.

Each of the devices according to the first and second embodiments includes a control device such as a CPU 510; memory devices such as a read only memory (ROM) 520 and a random access memory (RAM) 530; a communication I/F 54 that performs communication by establishing a connection with a network; and a bus 61 that interconnects the other constituent elements.

The computer programs that are executed in the devices according to the first and second embodiments are stored in advance in the ROM 520.

Alternatively, the computer programs that are executed in the devices according to the first and second embodiments can be recorded in the form of installable or executable files in a computer-readable recording medium such as a compact disk read only memory (CD-ROM), a flexible disk (FD), a compact disk readable (CD-R), or a digital versatile disk (DVD).

Still alternatively, the computer programs that are executed in the devices according to the first and second embodiments can be saved as downloadable files on a computer connected to the Internet or can be made available for distribution through a network such as the Internet.

Meanwhile, the computer programs that are executed in the devices according to the first and second embodiments contain a module for each of the abovementioned constituent elements to be implemented in a computer. In practice, for example, the CPU 510 reads the computer programs from a computer-readable memory medium and runs them such that the computer programs are loaded in a main memory device. As a result, the module for each of the abovementioned constituent elements is generated in the computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that is connected to a key generating device which generates an encryption key, the communication device comprising:
   a querying circuit configured to send a query to the key generating device about capability information which indicates capability of the key generating device to generate the encryption key;
   an encryption processor configured to implement a plurality of encryption functions, the encryption functions including an encryption function using the encryption key and an encryption function not using the encryption key; and
   a selecting circuit configured to select, from among the plurality of encryption functions, an encryption function according to the capability information, performance information that indicates performance in a case of implementing each of the plurality of encryption functions, and resource information that indicates a resource that is usable by the communication device, wherein
   the encryption processor implements the encryption function thus selected.

2. The device according to claim 1, further comprising a communicating circuit configured to perform communication using the encryption functions, wherein
   while the communicating circuit is performing the communication, the querying circuit sends a query to the key generating device about the capability information.

3. The device according to claim 1, wherein
   the selecting circuit selects a plurality of the encryption functions according to the capability information, the performance information, and the resource information; and
   the encryption processor implements the plurality of encryption functions thus selected.

4. The device according to claim 3, further comprising a communicating circuit configured to establish a plurality of communications respectively corresponding to the plurality of encryption functions that is selected, and performs communication using the plurality of communications thus established.

5. The device according to claim 1, wherein, from among the plurality of encryption functions, the selecting circuit selects an encryption function according to the capability information, the performance information, the resource information, and request information which indicates a request for an operation performed using the encryption key.

6. A key generating device that is connected to a communication device which makes use of an encryption key, the key generating device comprising:
   a generating circuit configured to generate the encryption key;
   a receiving circuit configured to receive, from the communication device, encryption function information which indicates a plurality of encryption functions that the communication device can implement, the encryption functions include an encryption function using the encryption key and an encryption function not using the encryption key; and
   a selecting circuit configured to select, from among the plurality of encryption functions indicated by the encryption function information, an encryption function according to capability information which indicates a capability of the generating circuit to generate the encryption key, performance information that indicates performance in a case of implementing each of the plurality of encryption functions, and resource information that indicates a resource that is usable by the communication device.

7. The device according to claim 6, further comprising a communicating circuit configured to communicate the generated encryption key to the communication device.

8. The device according to claim 6, wherein the selecting circuit selects a plurality of the encryption functions according to the capability information, the performance information, and the resource information.

9. The device according to claim 6, wherein
   the receiving circuit further receives, from the communication device, request information which indicates a request for an operation performed using the encryption key, and
   from among the plurality of encryption functions, the selecting circuit selects an encryption function according to the capability information, the performance information, the resource information, and the request information.

10. A non-transitory computer readable medium with computer readable instructions stored thereon, the computer readable instructions, when executed by a computer connected to a key generating device which generates an encryption key, cause the computer to perform a method comprising:

sending a query to the key generating device about capability information which indicates a capability of the key generating device to generate the encryption key;

implementing a plurality of encryption functions, the encryption functions including an encryption function using the encryption key and an encryption function not using the encryption key; and selecting, from among the plurality of encryption functions, an encryption function according to the capability information, performance information that indicates performance in a case of implementing each of the plurality of encryption functions, and resource information that indicates a resource that is usable by the communication device, wherein the implementing includes implementing the encryption function thus selected.

\* \* \* \* \*